(12) United States Patent
Kohler et al.

(10) Patent No.: US 10,088,208 B2
(45) Date of Patent: Oct. 2, 2018

(54) VAPOR COMPRESSION SYSTEM

(71) Applicant: Johnson Controls Technology Company, Plymouth, MI (US)

(72) Inventors: Jay A. Kohler, York, PA (US); Patrick Christian Marks, York, PA (US); Ian Michael Casper, York, PA (US); Kurt Devlin, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/399,601

(22) Filed: Jan. 5, 2017

(65) Prior Publication Data

US 2017/0191713 A1 Jul. 6, 2017

Related U.S. Application Data

(60) Provisional application No. 62/275,522, filed on Jan. 6, 2016.

(51) Int. Cl.
*F25B 39/00* (2006.01)
*F25B 43/00* (2006.01)
(Continued)

(52) U.S. Cl.
CPC ............ *F25B 43/006* (2013.01); *F25B 39/02* (2013.01); *F25B 39/028* (2013.01);
(Continued)

(58) Field of Classification Search
CPC .................. F25B 39/028; F25B 43/006; F25B 2239/021; F25B 2239/047;
(Continued)

(56) References Cited

U.S. PATENT DOCUMENTS 2,312,312 A * 3/1943 Beline ..................... F25B 39/02
62/394
3,191,396 A 6/1965 Ruddock
(Continued)

FOREIGN PATENT DOCUMENTS

DE 2336151 A1 2/1974
DE 102008016627 A1 10/2009
(Continued)

OTHER PUBLICATIONS

PCT International Search Report and Written Opinion for PCT Application No. PCT/US2017/012557 dated Apr. 5, 2017, 17 pgs.
(Continued)

*Primary Examiner* — Mohammad M Ali
(74) *Attorney, Agent, or Firm* — Fletcher Yoder, P.C.

(57) ABSTRACT

Embodiments of the present disclosure relate to a heating, ventilation, air conditioning, and refrigeration (HVAC&R) system that includes a refrigerant loop, a compressor disposed along the refrigerant loop and configured to circulate refrigerant through the refrigerant loop, a heat exchanger disposed along the refrigerant loop and configured to place the refrigerant in thermal communication with a cooling fluid flowing through tubes of a tube bundle within the heat exchanger, an inlet of the heat exchanger configured to direct the refrigerant into the heat exchanger, a trough of the heat exchanger configured to receive the refrigerant from the inlet, and a perforated baffle of the heat exchanger disposed downstream of the trough and configured to direct the refrigerant from the trough over the tubes of the tube bundle.

18 Claims, 6 Drawing Sheets

(51) Int. Cl.
   *F25B 39/02* (2006.01)
   *F25B 41/06* (2006.01)
   *F25B 40/02* (2006.01)
   *F28D 7/16* (2006.01)
   *F28D 21/00* (2006.01)
   *F25B 25/00* (2006.01)

(52) U.S. Cl.
   CPC .......... *F25B 41/062* (2013.01); *F25B 25/005* (2013.01); *F25B 40/02* (2013.01); *F25B 2339/0242* (2013.01); *F25B 2339/047* (2013.01); *F25B 2341/0661* (2013.01); *F25B 2341/0662* (2013.01); *F25B 2400/13* (2013.01); *F25B 2400/23* (2013.01); *F25B 2500/01* (2013.01); *F25B 2600/0253* (2013.01); *F25B 2600/2513* (2013.01); *F25B 2700/171* (2013.01); *F25B 2700/21162* (2013.01); *F25B 2700/21163* (2013.01); *F28D 7/16* (2013.01); *F28D 2021/0063* (2013.01); *F28D 2021/0071* (2013.01); *Y02B 30/741* (2013.01)

(58) Field of Classification Search
   CPC ............ F25B 2339/0242; F25B 41/062; F25B 39/02; F25B 40/02; F25B 2400/13; F25B 2700/21162; F25B 2600/2513; F25B 2341/0661; F25B 2700/21163; F25B 2341/0662; F25B 2700/171; F25B 25/005; F25B 2400/23; F25B 2500/01; F25B 2600/0253; F25B 1/053; F25B 41/06; F28D 2021/0063; Y02B 30/741
   USPC .................................................. 62/115, 504
   See application file for complete search history.

(56) References Cited

U.S. PATENT DOCUMENTS

| | | | |
|---|---|---|---|
| 3,270,517 A * | 9/1966 | Clark | F25B 1/00 165/174 |
| 3,779,524 A * | 12/1973 | Tanigawa | B01D 3/24 261/114.1 |
| 2006/0080998 A1 | 4/2006 | De Larminat et al. | |
| 2010/0139898 A1 | 6/2010 | Hung et al. | |
| 2011/0017432 A1 | 1/2011 | Kulankara et al. | |
| 2011/0056664 A1 | 3/2011 | De Larminat et al. | |
| 2013/0086937 A1 | 4/2013 | Albertson et al. | |
| 2015/0013950 A1 | 1/2015 | Numata et al. | |
| 2015/0168041 A1 | 6/2015 | Havard, Jr. et al. | |

FOREIGN PATENT DOCUMENTS

| | | |
|---|---|---|
| EP | 1477748 A1 | 11/2004 |
| EP | 1988345 A1 | 11/2008 |
| EP | 2589899 A1 | 5/2013 |
| WO | 9857104 A1 | 12/1998 |
| WO | 0144730 A1 | 6/2001 |
| WO | 2009004422 A2 | 1/2009 |
| WO | 2013144441 A1 | 10/2013 |
| WO | 2014179576 A2 | 11/2014 |
| WO | 2014197538 A1 | 12/2014 |
| WO | 2016057492 A1 | 4/2016 |

OTHER PUBLICATIONS

PCT International Search Report and Written Opinion for PCT Application No. PCT/US2017/012560 dated Apr. 6, 2017, 16 pgs.
PCT International Search Report and Written Opinion for PCT Application No. PCT/US2017/012575 dated Mar. 31, 2017, 17 pgs.
PCT International Search Report and Written Opinion for PCT Application No. PCT/US2017/012582 dated Mar. 30, 2017, 17 pgs.

* cited by examiner

VAPOR COMPRESSION SYSTEM

CROSS REFERENCE TO RELATED APPLICATIONS

This application claims priority from and the benefit of U.S. Provisional Application Ser. No. 62/275,522, filed Jan. 6, 2016, entitled "VAPOR COMPRESSION SYSTEM," the disclosure of which is hereby incorporated by reference in its entirety for all purposes.

BACKGROUND

This application relates generally to vapor compression systems incorporated in air conditioning and refrigeration applications.

Vapor compression systems utilize a working fluid, typically referred to as a refrigerant that changes phases between vapor, liquid, and combinations thereof in response to being subjected to different temperatures and pressures associated with operation of the vapor compression system. Refrigerants are desired that are friendly to the environment, yet have a coefficient of performance (COP) that is comparable to traditional refrigerants. COP is a ratio of heating or cooling provided to electrical energy consumed, and higher COPs equate to lower operating costs. Unfortunately, there are challenges associated with designing vapor compression system components compatible with environmentally-friendly refrigerants, and more specifically, vapor compression system components that operate to maximize efficiency using such refrigerants.

SUMMARY

In an embodiment of the present disclosure, a heating, ventilation, air conditioning, and refrigeration (HVAC&R) system includes a refrigerant loop, a compressor disposed along the refrigerant loop and configured to circulate refrigerant through the refrigerant loop, a heat exchanger disposed along the refrigerant loop and configured to place the refrigerant in thermal communication with a cooling fluid flowing through tubes of a tube bundle within the heat exchanger, an inlet of the heat exchanger configured to direct the refrigerant into the heat exchanger, a trough of the heat exchanger configured to receive the refrigerant from the inlet, and a perforated baffle of the heat exchanger disposed downstream of the trough and configured to direct the refrigerant from the trough over the tubes of the tube bundle.

In another embodiment of the present disclosure, a heating, ventilation, air condition, and refrigeration (HVAC&R) system includes a refrigerant loop, a compressor disposed along the refrigerant loop and configured to circulate refrigerant through the refrigerant loop, a heat exchanger disposed along the refrigerant loop and configured to place the refrigerant in thermal communication with a cooling fluid flowing through tubes of a tube bundle within the heat exchanger; an inlet of the heat exchanger configured to direct the refrigerant into the heat exchanger, and a corrugated perforated baffle of the heat exchanger downstream of the inlet, where the corrugated perforated baffle has one or more openings in a plurality of corrugations, and where the corrugated perforated baffle is configured to direct the refrigerant through the openings and over the tubes of the tube bundle.

In still another embodiment of the present disclosure, a heating, ventilation, air conditioning, and refrigeration (HVAC&R) system includes a heat exchanger disposed along a refrigerant loop and configured to place a refrigerant in thermal communication with a cooling fluid flowing through tubes of a tube bundle within the heat exchanger, an inlet of the heat exchanger configured to direct the refrigerant into the heat exchanger, and a distribution system of the heat exchanger. The distribution system includes a trough configured to receive the refrigerant from the inlet, a first base portion having one or more openings, where the first base portion is radially aligned with the trough relative to a central axis of a shell of the heat exchanger, such that the refrigerant in the trough is configured to flow through the openings and onto the tubes of the tube bundle, and a second base portion having one or more additional openings, where the second base portion is radially offset from the trough, such that a portion of the refrigerant that overflows from the trough flows through the additional openings and onto the tubes of the tube bundle.

DETAILED DESCRIPTION

Embodiments of the present disclosure are directed to a heat exchanger that enhances or improves distribution of refrigerant over tubes of a tube bundle that are disposed in a shell of the heat exchanger. For example, the heat exchanger may include a trough downstream of an inlet of the heat exchanger that receives the refrigerant from a source (e.g., a condenser, an expansion device, and/or another suitable vessel). As a level of the refrigerant in the trough rises, the refrigerant may ultimately overflow from the trough and onto a perforated baffle (e.g., a corrugated perforated baffle) before passing over the tubes of the tube bundle. In some embodiments, the trough may include openings (e.g., slots or apertures) that enable refrigerant to pass through the trough (e.g., without overflowing) and onto the outer surfaces of the tubes of the tube bundle. In any case, the heat exchanger may provide more uniform distribution of the refrigerant onto the tubes of the tube bundle by controlling a flow of the refrigerant from the inlet to the tube bundle (e.g., creates a uniform flow rate). Therefore, the heat exchanger may improve heat transfer between the refrigerant and the tubes while reducing a pressure head within the evaporator. Accordingly, an efficiency of the system may be increased and the system may be configured to utilize low pressure refrigerants effectively.

Figure 1:
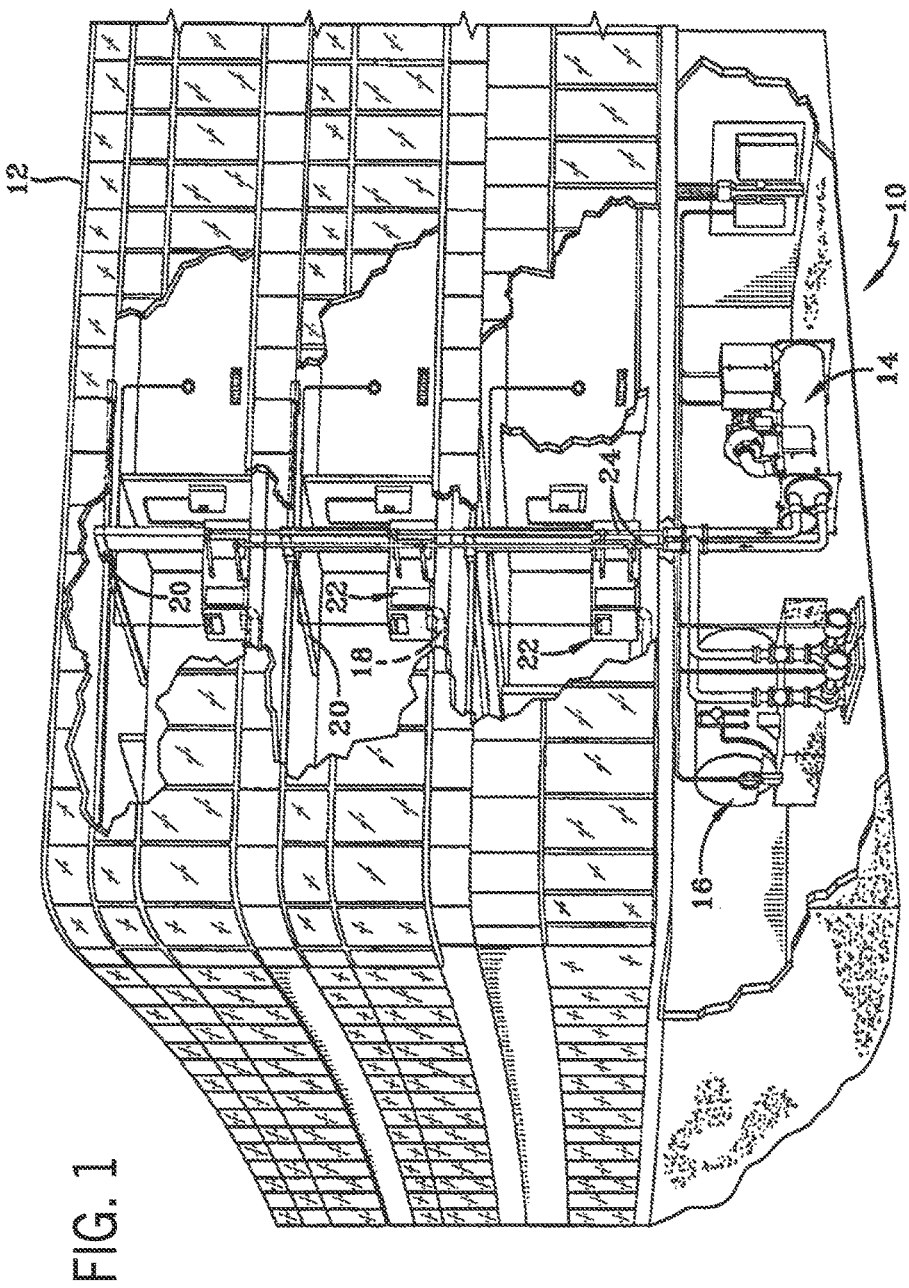
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
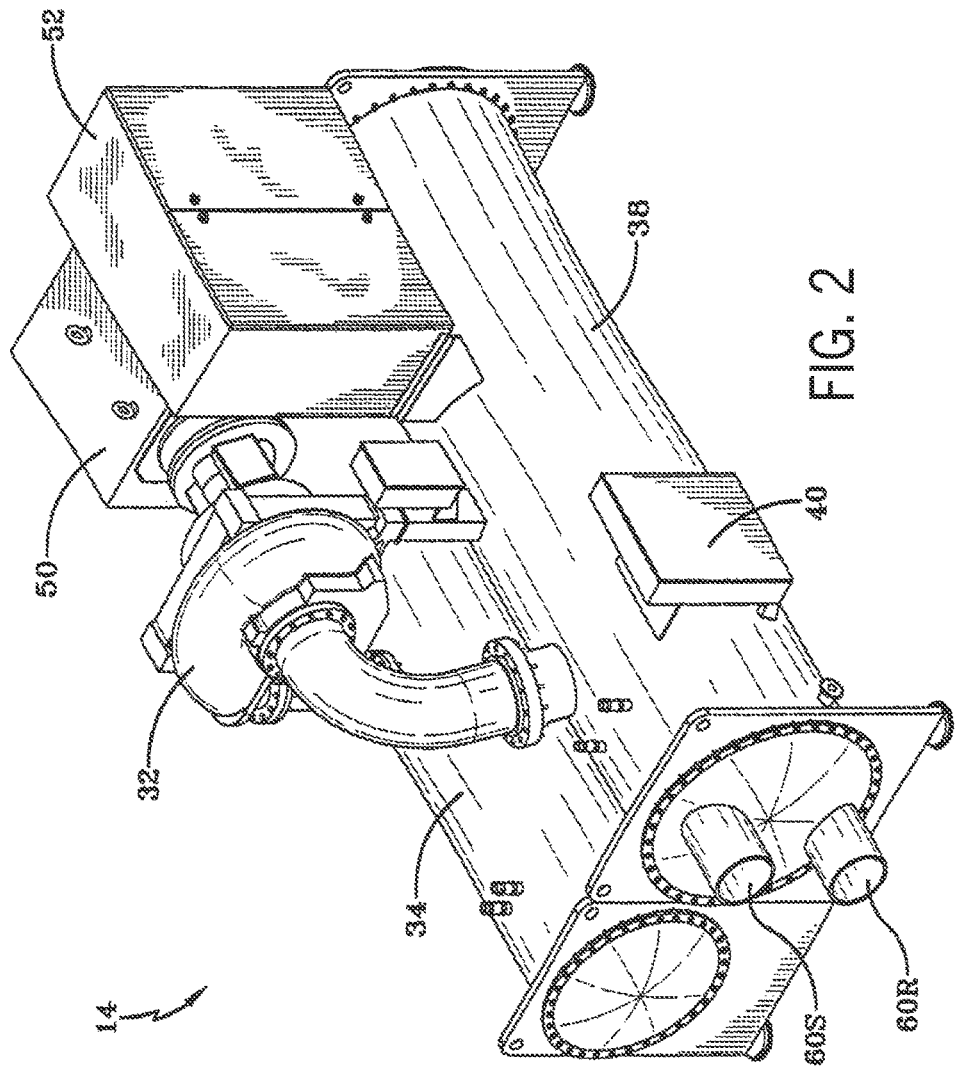
FIG. 2 is a perspective view of a vapor compression system, in accordance with an aspect of the present disclosure.
Figure 3:
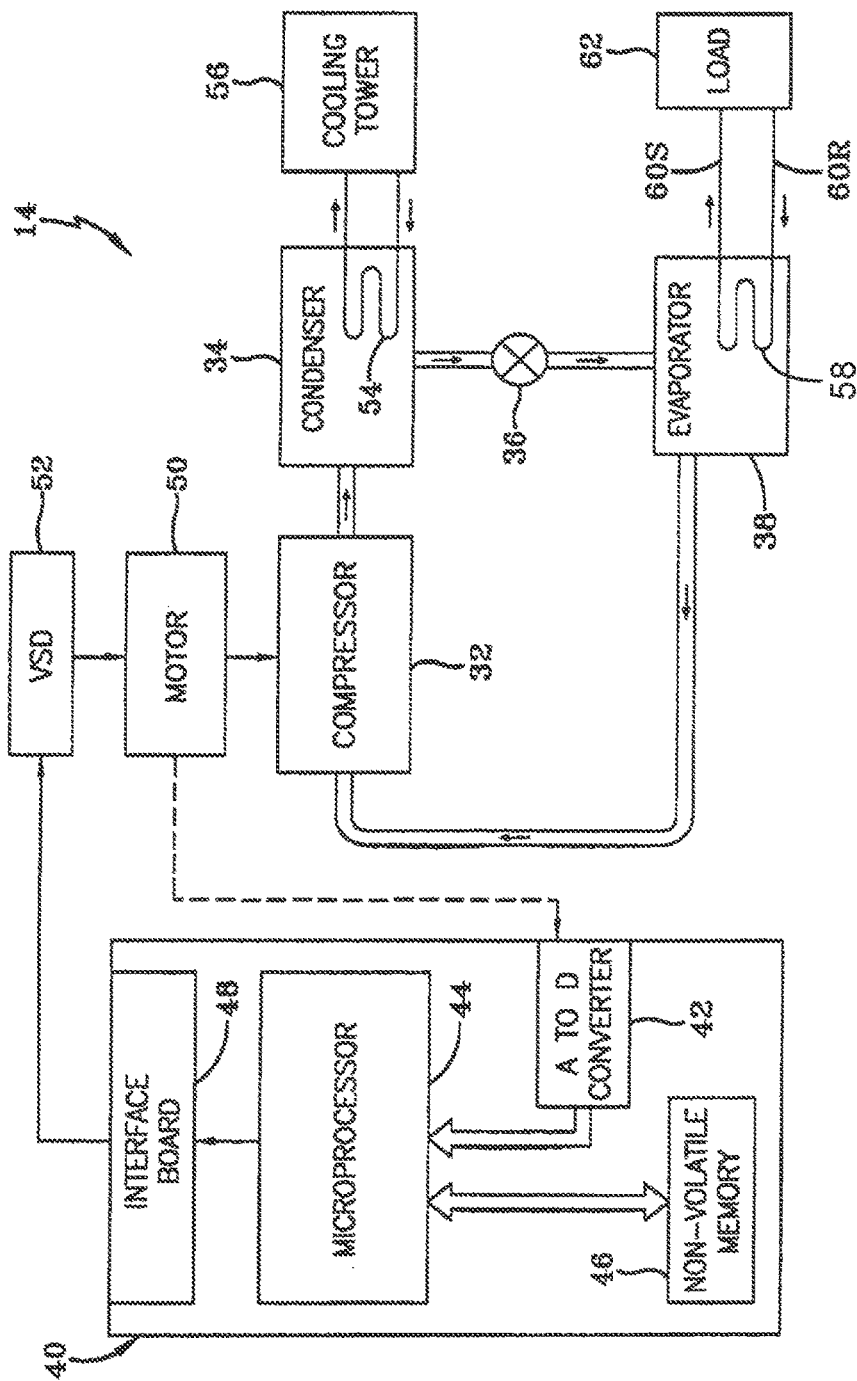
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
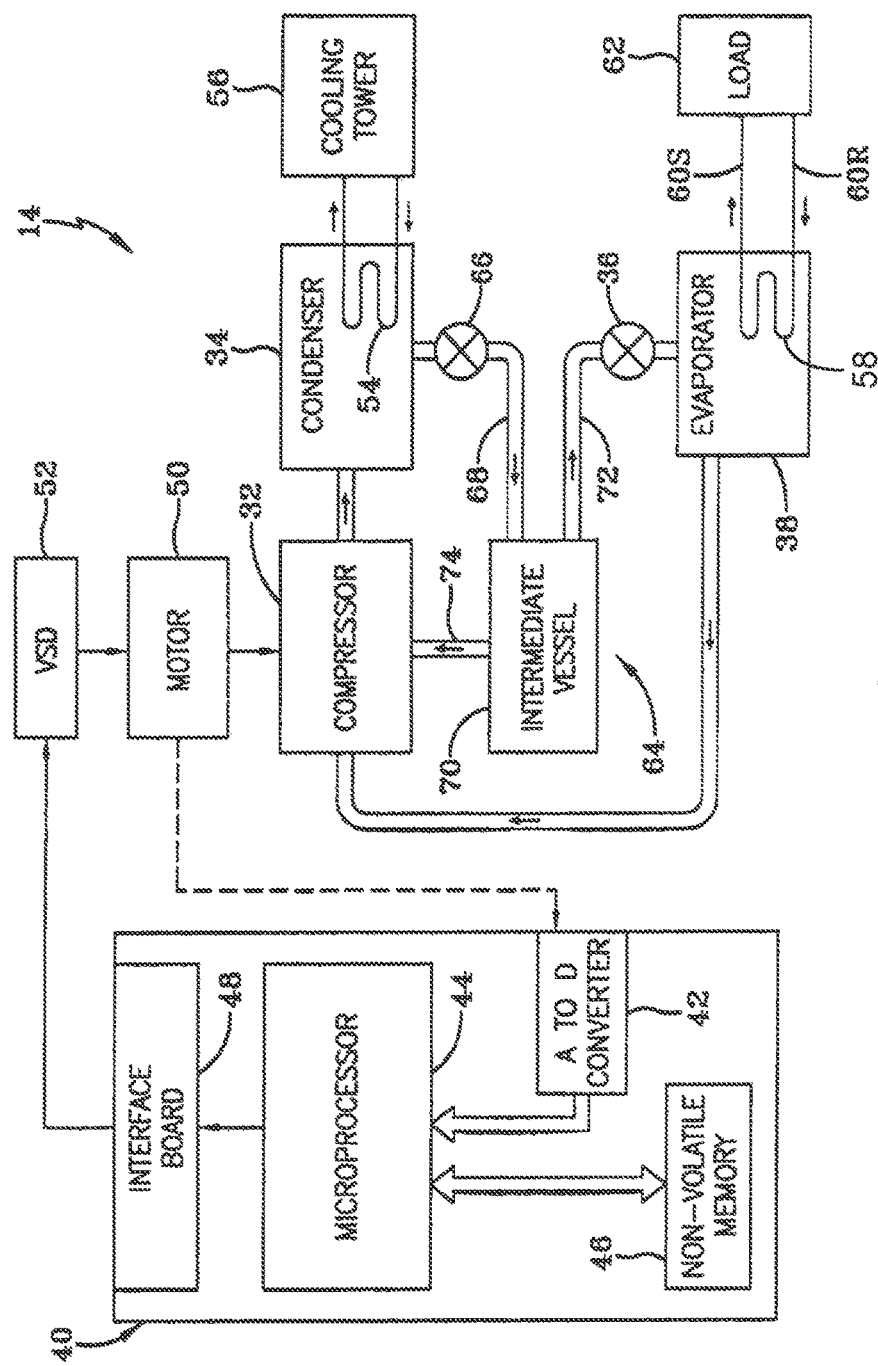
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

Typical heat exchangers (e.g., the condenser 34 and the evaporator 38) of a heating, ventilation, air conditioning, and refrigeration (HVAC&R) system may receive refrigerant in a shell of the heat exchanger so that the refrigerant surrounds a tube bundle in the shell and is in thermal communication with a cooling fluid in the tube bundle. Unfortunately, the refrigerant that accumulates in the shell of the heat exchanger may include a pressure head that corresponds to a height of the refrigerant in the shell. As a result of the pressure head, a temperature of the refrigerant at a lower height of the shell may be several degrees (e.g., Fahrenheit) warmer than a temperature of refrigerant at a higher height of the shell. This phenomenon is sometimes referred to as the "submergence penalty," and it may adversely affect an efficiency of the system. Further, the submergence penalty may discourage the use of low pressure refrigerants because an increased amount of refrigerant may be disposed in the shell of the heat exchanger to operate at or near full cooling capacity. The effect of the submergence penalty may be more noticeable for larger capacity chillers that have correspondingly deeper tube bundles. For example, the saturation temperature of a refrigerant such as R-123 (having a normal boiling point at 1 atmosphere of 82 degrees Fahrenheit) increases by about 0.39 degrees Fahrenheit for every inch of liquid head. In a flooded tube bundle, an effective density of the refrigerant is reduced due to the presence of vapor, which may reduce the submergence penalty by almost fifty percent (e.g., the saturation temperature increases 0.20 degrees Fahrenheit per inch). Accordingly, for a 12 inch tall bundle, there may be a 2.4 degree Fahrenheit difference in saturation temperature between the refrigerant located at the top and bottom of the bundle. The submergence penalty is the average impact over the entire bundle, taking into consideration the average depth of tubes.

To reduce the effect of the submergence penalty, the heat exchanger may be configured to include an overflow trough that enhances distribution of the refrigerant over the tube bundle. Additionally, a perforated baffle may be disposed between the trough and the tube bundle to further distribute the refrigerant over the tube bundle. For example, FIG. 5 is a cross section of an embodiment of a heat exchanger 100 (e.g., the condenser 34 and/or the evaporator 38) that may include an overflow trough 102 and a perforated baffle 104 to improve distribution of the refrigerant over a tube bundle 106, which may reduce the effects of the submergence penalty.

Figure 5:
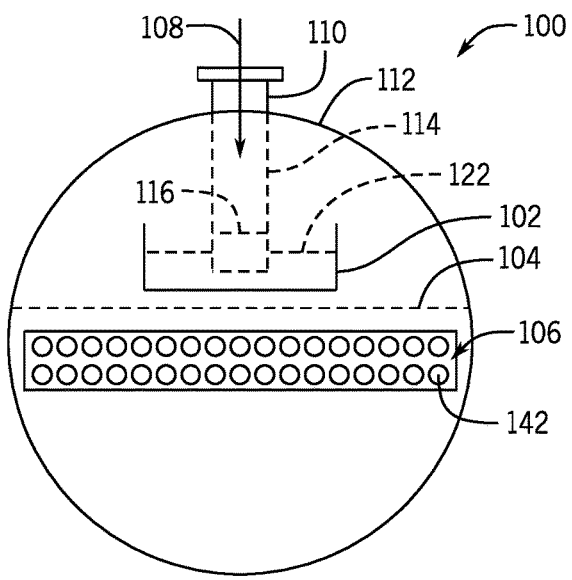
FIG. 5 is a cross section of an embodiment of a heat exchanger of the HVAC&R system that may enhance distribution of refrigerant over tubes of a tube bundle, in accordance with an aspect of the present disclosure.

As shown in the illustrated embodiment of FIG. 5, refrigerant 108 may be directed into the overflow trough 102 through an inlet 110 of the heat exchanger 100. The trough 102 may be positioned within a shell 112 of the heat exchanger 100. In some embodiments, the inlet 110 may include fitting 114 (e.g., an inverted tee). Additionally, the fitting 114 may include a flow splitting feature 116 (e.g., a baffle) to further divide the flow of refrigerant 108 toward opposite axial ends 118 and 120 of the trough 102 (see FIG. 6). However, in other embodiments, the inlet 110 may not include the fitting 114. In still further embodiments, the trough 102 may include a flow splitting feature 122. In some embodiments, the flow splitting feature 122 may include a protruding ridge that extends from a base of the trough 102 and forms one or more sloped surfaces that direct the refrigerant 108 toward the axial ends 118 and 120 of the trough 102. In other embodiments, the flow splitting feature 122 may include a conical or pyramidal protrusion that forms the sloped surfaces and directs the refrigerant 108 toward the axial ends 118 and 120 of the trough 102.

Figure 6:
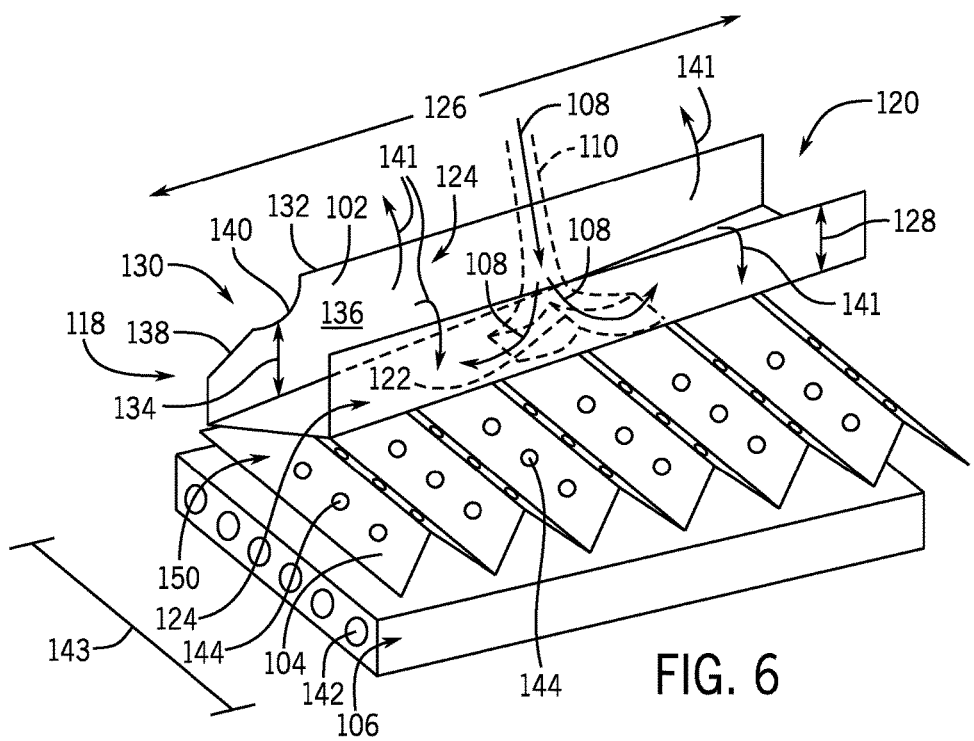
FIG. 6 is a perspective cross section view of the heat exchanger of FIG. 5 having a corrugated perforated baffle, in accordance with an aspect of the present disclosure.

FIG. 6 is a perspective cross section view of the trough 102 and the perforated baffle 104 of the heat exchanger 100 of FIG. 5. As shown in the illustrated embodiment of FIG. 6, edges 124 of the trough 102 may extend along a longitudinal length 126 of the trough 102. In some embodiments, the edges 124 may have a substantially uniform height 128. In other embodiments, at least a portion 130 of an edge 132 of the trough 102 may have a non-uniform height 134 (e.g., at least a portion of a wall 136 of the trough 102 is removed). For example, the edge 132 may be tapered, such that an amount of material removed to form the edge 132 increases as the distance from the inlet 110 increases. In some embodiments, the edge 132 may include at least one linear segment 138. Additionally or alternatively, the edge 132 may include a curved line segment 140.

When the refrigerant 108 reaches a target height within the trough 102, refrigerant overflow 141 occurs. In other words, the refrigerant 108 flows over the edges 124 of the trough 102 onto and through the perforated baffle 104 before flowing over tubes 142 of the tube bundle 106. As shown in the illustrated embodiment of FIG. 6, the perforated baffle 104 may be positioned along a width 143 of the tube bundle 106. Therefore, the refrigerant 108 that overflows from the trough 102 onto the perforated baffle 142 may be spread out along the width 143 of the tube bundle 106 by the perforated baffle 104. As the refrigerant 108 falls through slots 144 of the perforated baffle 104, the refrigerant 108 may be uniformly distributed along the width 143 of the tube bundle to enhance thermal energy transfer between the refrigerant 108 and a cooling fluid flowing through the tubes 142.

Figure 7:
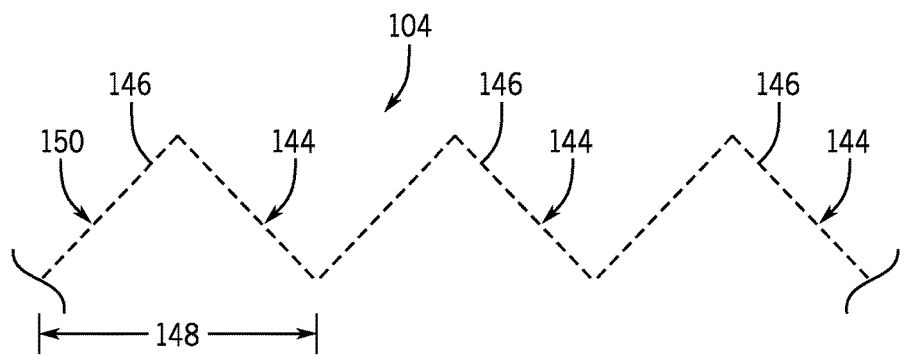
FIG. 7 is a schematic of the corrugated perforated baffle of FIG. 6, in accordance with an aspect of the present disclosure.

In some embodiments, the perforated baffle 104 may be a corrugated perforated baffle. For example, FIG. 7 is a schematic of the perforated baffle 104 having a corrugated configuration. As shown in the illustrated embodiment of FIG. 7, the perforated baffle 104 has the slots 144 (e.g., openings) formed therein to promote substantially uniform distribution of the refrigerant 108 over the tube bundle 106. In some embodiments, a size of corrugations 146 of the perforated baffle 104 may be substantially uniform relative to one another. In other embodiments, at least a portion of the corrugations 146 of the perforated baffle 104 may be non-uniform in size relative to one another. Additionally, a width 148 of the corrugations 146 of the perforated baffle 104 may be substantially uniform relative to one another or non-uniform relative to one another. Further, an arrangement of the slots 144 may be substantially uniform or non-uniform along a surface 150 of the perforated baffle 104.

The configuration described above with reference to FIGS. 5-7 may reduce a pressure head of the refrigerant (e.g., lift), and thus, at least partially mitigate the effects of the submergence penalty. For example, directing the refrigerant 108 into the trough 102 from the inlet 110 may contain the refrigerant 108 within the trough 102 until a level of the refrigerant 108 in the trough 102 exceeds a height of the edges 132. Therefore, a pressure head of the refrigerant 108 in the heat exchanger 100 may be controlled via geometric dimensions of the trough 102. Additionally, a flow of the refrigerant 108 that may be distributed over the tubes 142 of the tube bundle 106 may be at a more uniform rate when compared to typical heat exchangers. The uniform distribution of the refrigerant 108 may enable an increase in thermal energy transfer by controlling an amount of the refrigerant 108 that contacts the tubes 142 over time. Accordingly, an efficiency of the system may be enhanced, and low pressure refrigerants may be utilized effectively.

In some embodiments, distribution of the refrigerant 108 may be less effective when the system 10 operates at low loads. For example, a relatively low flow rate of the refrigerant 108 may overflow from the trough 102 when the system 10 operates at reduced loads. The relatively low flow rate of the refrigerant 108 may lead to a reduction in distribution of the refrigerant 108 over the perforated baffle 104 and/or the tube bundle 106. Accordingly, FIG. 8 is a cross section of an embodiment of the heat exchanger 100 that may increase distribution of the refrigerant 108 even when the system 10 operates at low loads.

Figure 8:
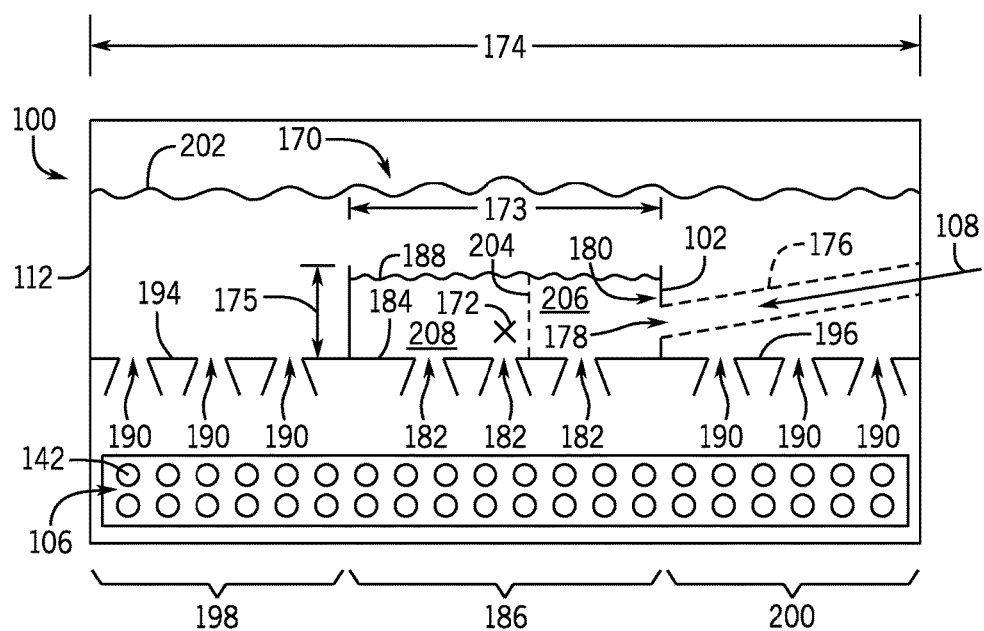
FIG. 8 is a cross section of an embodiment of the heat exchanger of the HVAC&R system that may enhance distribution of refrigerant over the tubes of the tube bundle, in accordance with an aspect of the present disclosure.

For example, FIG. 8 illustrates the heat exchanger 100 (e.g., the evaporator 38) having a spray header or distributor 170 that efficiently distributes the refrigerant 108 over a large range of operating conditions. In some embodiments, the heat exchanger 100 may include the evaporator 38 having a falling film arrangement, a flooded arrangement, and/or a hybrid flooded/falling film arrangement. The distributor 170 includes the trough 102 (e.g., basin, reservoir, etc.) positioned inside of the shell 112. In some embodiments, the trough 102 may be positioned centrally inside of the shell 112. In other embodiments, the trough 102 may be positioned non-centrally within the shell 112 (e.g., offset from a central axis 172 of the shell 112). Additionally, the trough 102 may extend along an entire axial length of the shell 112. In other embodiments the trough 102 may extend along a portion of the axial length of the shell 112. In any case, the trough 102 may extend along any suitable portion of the axial length of the shell 112 that enables effective distribution of the refrigerant 108 (e.g., at least 50% of the axial length of the shell, at least 60% of the axial length of the shell, or at least 75% of the axial length of the shell). A width 173 of the trough 102 may be approximately (e.g., within 10%, within 5%, within 2% of, etc.) half of a diameter 174 of the shell 112. In other embodiments, the width 173 of the trough 102 may be more than half the diameter 174 of the shell 112 or less than half of the diameter 174 of the shell 112. A height 175 of the trough 102 may be determined based on a target refrigerant charge at design conditions. The refrigerant 108 may be at least partially provided to the trough 102 by the condenser 34 and/or at least partially provided by an economizer or flash tank (e.g., the intermediate vessel 70).

As further shown in FIG. 8, an inlet 176 is in fluid communication with an opening 178 formed in a sidewall 180 of the trough 102. The trough 102 initially receives all of the refrigerant 108 via the inlet 176. When the system 10 operates at reduced loads (e.g., loads less than a maximum heating or cooling rate) a reduced flow rate of the refrigerant 108 may enter the trough 102. In response to a reduced flow rate of the refrigerant 108, a level of the refrigerant 108 remains sufficiently low, such that all of the refrigerant 108 is contained by the trough 102 (e.g., the refrigerant 108 does not overflow from the trough 102). The refrigerant 108 may be discharged from the trough 102 via openings 182 (e.g., slits or apertures) formed in a base portion 184 (e.g., the perforated baffle 104) of the distributor 170. The openings 182 that are formed in the base portion 184 radially overlap with the trough 102 and may define a first flow region 186. In other words, the refrigerant 108 is discharged from the trough 102 along the first flow region 186. The refrigerant 108 is then distributed over a portion of the tube bundle 106.

In some embodiments, the openings 182 include low flow and/or low pressure head nozzles or another suitable flow device. In other embodiments, at least a portion of the openings 182 may include high flow and/or high pressure head nozzles or another suitable flow device (e.g., to accommodate system conditions in which the refrigerant level is above an overflow level 188 of the trough 102). A flow of the refrigerant 108 through the openings 182 may be in the form of a stream or droplets that are applied to the outer surface of the tubes 142 of the tube bundle 106. The flow of the refrigerant 108 through the openings 182 may be substantially uniform or at least a portion of the flow of the refrigerant 108 may be non-uniform (e.g., droplet size and/or frequency through one of the openings 182 may be different than the droplet size or frequency through other another one of the openings 182). Further, in some embodiments, the openings 182 may be equally spaced (e.g., radially and axially) along a length and/or width of the trough 102. In other embodiments, the openings 182 may be non-uniformly spaced either radially or axially along the length and/or the width of the trough 102.

In order to accommodate system operating conditions of maximum or near maximum heating or cooling capacity, the distributor 170 may include openings 190 that are not aligned with the trough 102 (e.g., the refrigerant 108 in the trough 102 cannot flow directly toward the tube bundle 106 through the openings 190). When the flow rate of the refrigerant 108 into the trough 102 is sufficiently high, a level of the refrigerant 108 in the trough 102 may exceed the sidewalls 180 of the trough 102 and overflow from the trough 102 (e.g., the level of the refrigerant 108 exceeds the overflow level 188). Accordingly, the flow of the refrigerant 108 discharged from the openings 182 may be less than the flow of the refrigerant 108 entering the trough 102, such that the level of the refrigerant 108 in the trough 102 rises until reaching the overflow level 188. After reaching the overflow level 188, the refrigerant 108 may overflow from the trough 102 and accumulate in base portions 194 and 196 of the distributor 170 (e.g., the base portions 194 and 196 do not radially overlap with the trough 102). In some embodiments, the base portions 194 and 196 may be separate from the base portion 184. In other embodiments, the base portions 184, 194, and 196 may be made from a single sheet or plate (e.g., the base portions 184, 194, and 196 may form the perforated baffle 104). In any case, the refrigerant 108 accumulating in the base portions 194 and 196 of the distributor 170 may be discharged via the openings 190 (e.g., slits or apertures). The openings 190 of the base portion 194 may define a second flow region 198 and the openings of the base portion 196 may define a third flow region 200 of the heat exchanger 100.

In some cases, the flow rate of the refrigerant 108 discharged from the openings 190 may continue to be less than the flow rate of the refrigerant 108 received by trough 102, such that the level of the refrigerant 108 rises above an overflow level 202 of the shell 112. In some embodiments, the openings 190 may include high flow and/or high pressure head nozzles or another suitable flow device to account for such high flow operating conditions. In other embodiments, at least a portion of the openings 190 may include low flow and/or low pressure head nozzles or another suitable flow device. A flow of the refrigerant 108 through the openings 190 may be in the form of a stream or droplets that are applied to the outer surface of the tubes 142 of the tube bundle 106. The flow of the refrigerant 108 through the openings 190 may be substantially uniform or at least a portion of the flow of the refrigerant 108 may be non-uniform (e.g., droplet size and/or frequency through one of the openings 190 may be different than the droplet size or frequency through other another one of the openings 190).

Further, in some embodiments, the openings 190 may be equally spaced (e.g., radially and axially) along a length and/or width of the base portions 194 and/or 196. In other embodiments, the openings 190 may be non-uniformly spaced either radially or axially along the length and/or the width of the base portions 194 and/or 196.

In some embodiments, the first flow region 186 may be disposed between the second flow region 198 and the third flow region 200. In still further embodiments, the second and third flow regions 198, 200 may be consolidated into a larger sized flow region configured to accommodate the overflow of the refrigerant 108 from the trough 102. While the illustrated embodiment of FIG. 8 shows the second and third flow regions 198, 200 as being substantially equal in size, in other embodiments, the second and third flow regions 198, 200 may be unequally sized relative to one another. Further, the flow region 186 may be separated into at least two separate flow regions. Separating the flow region 186 into at least two separate flow regions may enable the refrigerant 108 to be received into the shell 112 via at least two separate sources (e.g., the condenser 34, the intermediate vessel 70, and/or another suitable source). For example, the trough 102 may include a baffle 204 that separates the trough 102 into two portions. Accordingly, the inlet 176 may supply the refrigerant 108 from a first source to a first portion 206 of the trough 102. Additionally, a second inlet may be included in the heat exchanger 100 that is fluidly coupled with a second portion 208 of the trough 102. The second inlet may receive the refrigerant from a second source. The two separate sources may include an overflow level that is substantially the same or different relative to one another. Thus, the first portion 206 and the second portion 208 of the trough 102 may be sized based on the overflow level of the source supplying the refrigerant 108. In some embodiments, the shell 112 may include less than three of the flow regions 186, 198, and/or 200 (e.g., two or one flow region). In other embodiments, the shell 112 may include more than three of the flow regions 186, 198, and/or 200 (e.g., four, five, six, seven, eight, nine, ten, or more of the flow regions). Further, the flow regions 186, 198, 200 may be arranged in any suitable configuration to enhance distribution of the refrigerant 108 over the tubes 142 of the tube bundle 106.

The heat exchanger arrangement discussed above with respect to FIG. 8 may distribute sufficient amounts of the refrigerant 108 over at least a portion of the tube bundle 106 to permit efficient operation at both reduced system operating conditions and at maximum or near maximum system operating conditions. Moreover, the above-described heat exchanger arrangement may reduce an overall height of the refrigerant 108 within the heat exchanger 100. Accordingly, pressure head in the heat exchanger 100 may be reduced, thereby permitting efficient operation of the system when using low pressure refrigerants.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, air conditioning, and refrigeration (HVAC&R) system comprising:
a refrigerant loop;
a compressor disposed along the refrigerant loop and configured to circulate refrigerant through the refrigerant loop;
a heat exchanger dispose along the refrigerant loop and configured to place the refrigerant in thermal communication with a cooling fluid flowing through tubes of a tube bundle within the heat exchanger;
an inlet of the heat exchanger configured to direct the refrigerant into the heat exchanger;
a trough of the heat exchanger configured to receive the refrigerant from the inlet; and
a perforated baffle of the heat exchanger disposed downstream of the trough, wherein the trough comprises sidewalls and is configured to direct the refrigerant to the perforated baffle when the refrigerant accumulates within the trough and overflows from the sidewalls of the trough and onto the perforated baffle, and wherein the perforated baffle is configured to direct the refrigerant from the trough over the tubes of the tube bundle.

2. The HVAC&R system of claim 1, wherein the perforated baffle is a corrugated perforated baffle.

3. The HVAC&R system of claim 2, wherein the corrugated perforated baffle comprises a plurality of uniform corrugations, spaced substantially equally apart from one another.

4. The HVAC&R system of claim 1, wherein the trough extends along an entire axial length of the heat exchanger.

5. The HVAC&R system of claim 1, wherein the inlet comprises a fitting having a flow splitting device configured to direct the refrigerant to opposing ends of the trough.

6. The HVAC&R system of claim 1, wherein the inlet extends through a shell of the heat exchanger and into a sidewall of the sidewalls of the trough.

7. The HVAC&R system of claim 1, wherein the trough comprises a flow splitting device configured to direct the refrigerant the refrigerant to opposing ends of the trough.

8. The HVAC&R system of claim 1, comprising the refrigerant, and wherein the refrigerant is a low pressure refrigerant.

9. The HVAC&R system of claim 1, wherein a base plate of the trough comprises one or more openings configured to direct the refrigerant onto the tubes of the tube bundle.

10. A heating, ventilation, air condition, and refrigeration (HVAC&R) system, comprising:
a refrigerant loop;
a compressor disposed along the refrigerant loop and configured to circulate refrigerant through the refrigerant loop;
a heat exchanger disposed along the refrigerant loop and configured to place the refrigerant in thermal communication with a cooling fluid flowing through tubes of a tube bundle within the heat exchanger;

an inlet of the heat exchanger configured to direct the refrigerant into the heat exchanger;

a trough of the heat exchanger configured to receive the refrigerant from the inlet; and a corrugated perforated baffle of the heat exchanger downstream of the trough, wherein the trough comprises sidewalls and is configured to direct the refrigerant to the corrugated perforated baffle when the refrigerant accumulates within the trough and overflows from the sidewalls of the trough and onto the corrugated perforated baffle, and wherein the corrugated perforated baffle comprises one or more openings in a plurality of corrugations, and wherein the corrugated perforated baffle is configured to direct the refrigerant through the openings and over the tubes of the tube bundle.

11. The HVAC&R system of claim 10, wherein the plurality of corrugations are uniform relative to one another and spaced substantially equally from one another.

12. The HVAC&R system of claim 10, wherein the corrugated perforated baffle extends along a width of the tube bundle to provide a uniform distribution of the refrigerant over the tubes of the tube bundle.

13. The HVAC&R system of claim 10, wherein trough comprises edges, and wherein an edge of the edges includes a height that decreases as a distance from an inlet of the heat exchanger increases.

14. The HVAC&R system of claim 10, wherein a base plate of the trough comprises one or more openings configured to direct the refrigerant to the tubes of the tube bundle.

15. A heating, ventilation, air conditioning, and refrigeration (HVAC&R) system, comprising:

a heat exchanger disposed along a refrigerant loop and configured to place a refrigerant in thermal communication with a cooling fluid flowing through tubes of a tube bundle within the heat exchanger;

an inlet of the heat exchanger configured to direct the refrigerant into the heat exchanger; and a distribution system of the heat exchanger, wherein the distribution system, comprises:

a trough configured to receive the refrigerant from the inlet;

a first base portion comprising one or more openings, wherein the first base portion is radially aligned with the trough relative to a central axis of a shell of the heat exchanger, such that the refrigerant in the trough is configured to flow through the openings and onto the tubes of the tube bundle; and a second base portion comprising one or more additional openings, wherein the second base portion is radially offset from the trough, such that a portion of the refrigerant that overflows from the trough flows through the additional openings and onto the tubes of the tube bundle.

16. The HVAC&R system of claim 15, wherein the one or more openings comprise low flow nozzles and wherein the one or more additional openings comprise high flow nozzles.

17. The HVAC&R system of claim 15, comprising the inlet of the heat exchanger, wherein the inlet extends through a shell of the heat exchanger and into a sidewall of the trough.

18. The HVAC&R system of claim 15, wherein the trough extends along an entire axial length of the heat exchanger.

* * * * *